July 15, 1924.

M. MATSUO

BAKING MACHINE

Filed March 9, 1921   3 Sheets-Sheet 3

1,501,494

INVENTOR.
MANJI MATSUO

Chas. E. Townsend
ATTORNEY

Patented July 15, 1924.

1,501,494

UNITED STATES PATENT OFFICE.

MANJI MATSUO, OF SAN FRANCISCO, CALIFORNIA, ASSIGNOR TO KIKUYE MATSUO, OF SAN FRANCISCO, CALIFORNIA.

BAKING MACHINE.

Application filed March 9, 1921. Serial No. 451,012.

*To all whom it may concern:*

Be it known that I, MANJI MATSUO, a subject of the Emperor of Japan, residing at the city and county of San Francisco, and State of California, have invented new and useful Improvements in Baking Machines, of which the following is a specification.

This invention relates to a baking machine, and especially to the multiple mould type, having means for automatically opening and closing the same and in which the dough is automatically delivered to the moulds and discharged therefrom when baked.

One of the objects of the present invention is to generally improve and simplify machines of this character, and especially to provide a machine which is continuous and automatic in operation, generally adaptable for varying bakery products, and by which uniform and efficient results may be obtained.

Another object of the invention is to provide a continuously driven endless carrier, a plurality of moulds supported thereby, a cover for each mould, means actuated by the movement of the moulds for opening and closing the covers, means also actuated by the movement of the moulds for delivering dough to each successive mould, and means for automatically discharging the baked product.

Further objects will hereinafter appear.

The invention consists of the parts and the construction, combination and arrangement of parts as hereinafter more fully described and claimed, having reference to the accompanying drawings, in which—

Figure 1:
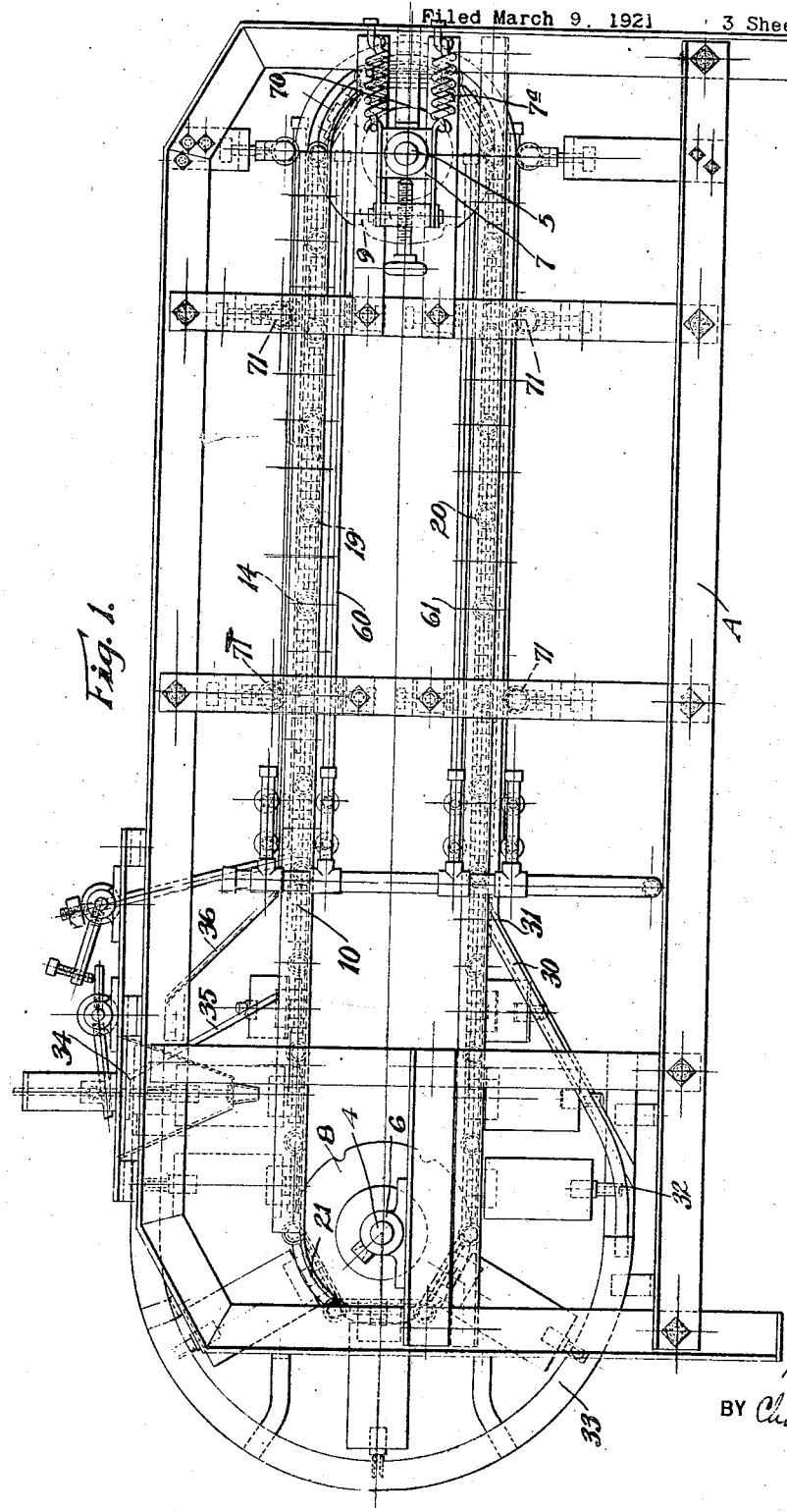
Fig. 1 is a side elevation of the machine.
Figure 2:
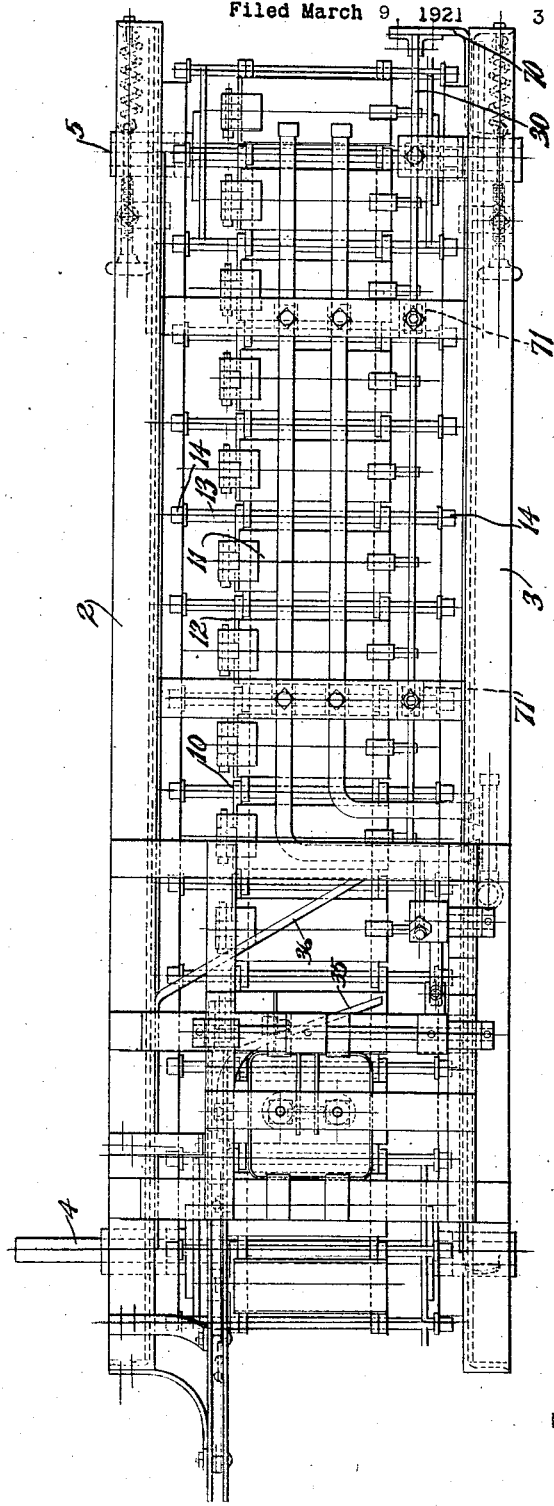
Fig. 2 is a plan view of the same.
Figure 3:
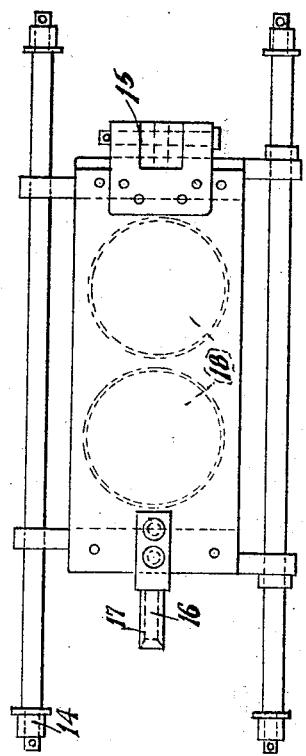
Fig. 3 is an enlarged plan view of one of the moulds.
Figure 4:
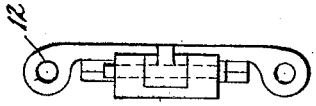
Fig. 4 is an end view of the same.
Figure 5:
Fig. 5 is a side elevation of one of the moulds.

Referring to the drawings in detail, and particularly to Figs. 1 and 2, A indicates in general a main frame, consisting of a pair of interspaced side frames, such as shown at 2 and 3. Extending crosswise of the side frames and journalled at each end thereof is a pair of shafts 4 and 5; the shaft 4 being held in stationary journal members 6, while the shaft 5 is supported in adjustable bearing members 7, such as generally shown in Fig. 1. Secured on the shaft 4, at each end thereof between the side frames 2 and 3, is a pair of sprocket wheels 8, and similarly secured on the shaft 5 is a pair of sprocket wheels 9, and supported by the sprocket wheels 8 and 9 is an endless carrier generally indicated at 10. This carrier consists of a series of interspaced moulds 11, on each side of which is formed hinged lugs 12. Extending through the lugs 12 are rods 13, and journalled on each rod is a pair of rollers 14, one disposed at each end thereof. The moulds, together with the lugs formed on each side thereof, in reality form the links of the endless carrier, while the rods 13 form the pins or rods by which the lugs swing during the movement of the carrier, and particularly when passing around the sprockets indicated at 8 and 9. The moulds proper consist of a bottom section 11ª and a cover section 14ª, the cover section being hingedly secured to the bottom section as at 15. The opposite end of each cover is provided with a projecting lug or pin 16, and each pin is enclosed by a roller 17, the function of which will hereinafter be described.

Formed in the bottom section of the mould are two or more depressions such as shown at 18, to which the dough is delivered. Similar depressions may be formed in the cover, but are not employed in this instance as a flattened cake circular in shape is desired.

Secured to the respective side frames 2 and 3 are upper and lower sets of channel tracks 19 and 20. These tracks are provided for the reception of the rollers 14 and maintain the endless carrier on a horizontal plane during its passage between the sprocket wheels 8 and 9. The channel tracks have a length substantially equal to the distance between the sprocket wheels 8 and 9, and their ends are curved as at 21 to guide the rollers into the channel tracks when the rods are released by the sprockets. Secured on the side frame section 3 is a second channel shaped track 30, into which the rollers 17 project. This track serves the function of automatically opening and closing the covers of the respective moulds, and thereby permits delivery of dough and removal of the baked product. By referring to Fig. 1, it will be seen that the track 30 runs practically parallel with the channel tracks 19 and 20 for a considerable distance, but that the track 30 is gradually extended or flared commencing at the point 31. At this point it is desired to open the covers to discharge the product and for this reason the flare or angle of the track 30 is made such that the covers will be completely opened when the point 32 is reached. From this point the track forms a true radius of a circle as shown at 33, this radius being maintained until a point 34 is reached. At this point the dough has been delivered and it is therefore necessary to close the covers. This closing operation is taken care of by two downwardly inclined guides or cam members 35 and 36. It should be stated that the covers at the beginning of the closing operation ride on the upper surface of the cam 35 and close by gravity action. However, if for any reason the covers do not close during this period, continued movement of the carrier will bring the covers in engagement with the underside of the cam 36, which engagement will positively force the covers into closed position. The covers are then held in closed position until the point 31 is again reached, where they are forcibly opened by the downwardly inclined track section.

Figure 6:
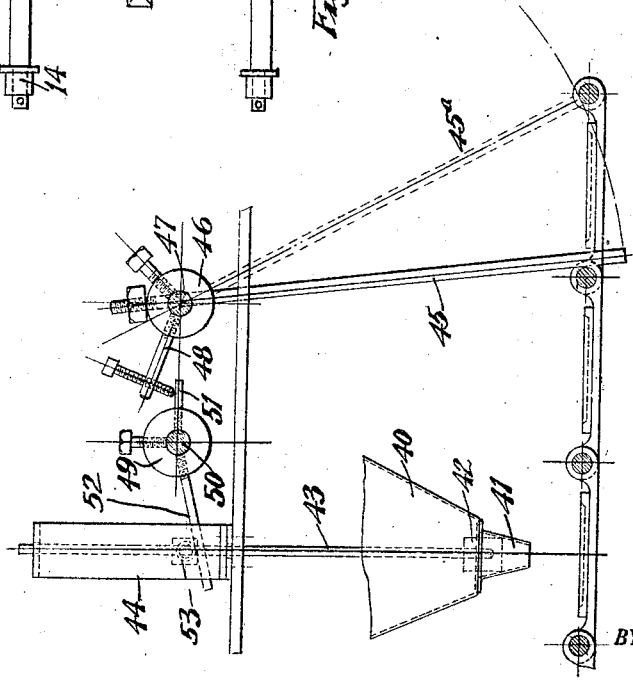
Fig. 6 is a detail view of the dough container and the valve actuating mechanism cooperating therewith.

The dough delivering mechanism consists of a container 40, in the bottom of which is formed a discharge spout 41, said spout being normally closed by a valve 42 of suitable shape, which is secured on the lower end of a rod 43. This rod is centrally disposed with relation to the tank and is guided by an upper frame 44, through which it extends. In the present instance it will be seen that the mould is provided with two depressions or recesses 18 for the reception of dough. For this reason two discharge nozles 41 are employed, and similarly two rods 43. The movement of the moulds is dependent upon for automatically opening and closing the valves 42 in unison. This opening and closing of the valves to discharge the dough as each mould registers therewith is accomplished by providing a downwardly extending rod 45. This rod is secured at its upper end in a collar 46 carried by a shaft 47 journalled in the upper part of the frame. Formed on this collar is a rocker arm 48, and formed on a collar 49 secured on a shaft 50, also journalled in the upper part of the frame is a rocker arm 51. This collar carries a second rocker arm 52, on the opposite side of which engages a cross frame 53 by which the respective rods 43 are connected. The depending rod 45 is successively engaged by the rods 13 connecting the moulds. Each rod 13 during its forward movement will engage the lower end of the rod 45 and therefore swing it in the arc of a circle from the full lined position shown at 45 to the dotted line position indicated at 45ᵃ. This movement imparts an oscillating movement to the shaft 47 and the rocker arm 48. This rocker arm in turn transmits an oscillating movement to the shaft 50 and the rocker arms 51 and 52 carried thereby. The rocker arm 52 during its movement naturally engages the cross frame 53 and thereby imparts a vertical movement to said frame and the rods 43 carried thereby. As the valves 42 are secured to these rods, it is obvious that they are opened in unison as each mould passes below the spouts 41 and a given quantity of dough is therefore discharged into each recess 18 of each mould as it passes. The valves are of course automatically closed the moment the depending rod 45 has reached the limit of its movement; the several parts automatically resuming their normal position by gravity or spring action. By referring to Fig. 6 it will be seen that the several rocker arms and the connections formed between the same are adjustable. This is of more or less importance as it permits accurate adjustment of the valve actuating mechanism with relation to the travel of the moulds.

In actual operation with the container 40 filled with dough in a somewhat fluid state, it is obvious that as each mould passes by or registers with the spouts 41, predetermined quantities of dough will be delivered to each mould. Almost immediately after this delivery, the covers will be closed by the cams 35 and 36 and they will be held in closed position until the point 31 is reached. During the time period required to travel this distance, the moulds are subjected to the heat of a series of gas burners arranged both on top and below the moulds as indicated at 60 and 61. These burners consist of elongated perforated pipes to which air and gas is delivered in the ordinary manner. The gas thus delivered is ignited and maintains an intense flame or at least a flame having a sufficient temperature to impart the required heat. The moulds, in other words, are travelling through a heated area when the guides 35 and 36 are left and remain in this heated area until the point 31 is reached. The baking of the dough delivered to the moulds is here completed and the covers are forcibly opened by the inclined track section there shown; the baked product being permitted to drop by gravity to a discharge chute or similar means not here shown. The covers are maintained in an open position during the remaining portion of their travel by the track section 33 and in fact are held open until a new batch of dough is delivered thereto when the covers are immediately closed by the cam or guide sections 35 and 36. The endless carrier may be intermittently or continuously driven by the shaft 4 and the speed of travel may of course be varied to suit the different products handled. Said means are not here shown as it is obvious that any suitable driving mechanism may be employed. I similarly wish it understood that various changes in form and proportion may be resorted to within the scope of the appended claims, similarly that the materials and finish of the several parts employed may be such as the experience and judgment of the manufacturer may dictate or varying uses may demand.

By referring to Figs. 1 and 2, it will be seen that the track or cam member 30, which extends from the point 36 to the point 31, is separate with relation to the remainder of the track section, and that it is so supported that an endwise movement may be imparted thereto. This is very important as it has been found in actual practice that the endless carrier expands to a considerable extent when heated, such expansion does, however, not slacken the chain to any degree as the adjustable bearing 7, which supports the sprockets 9, moves endwise whenever the chain contracts or expands due to the constant pull exerted thereon by the springs 7ª. If the track or cam section 30 was stationary and rigidly secured to the frame proper, it is obvious that the projecting lugs 17 on the mould covers would have a tendency to stick and jam, particularly when making the turn about the sprockets 9. This is, however, avoided as the rounded portion of the cam track is secured to the bearing 7 by means of a bracket arm 70. The remaining portion of the cam or track is supported between rollers such as indicated at 71 and as such has a free endwise movement when the endless carrier expands or contracts. The chances of the projecting lugs on the covers jamming or sticking are thus avoided as a predetermined spacing between the sprockets 9 and the rounded portion of the member 30 is automatically maintained by the connecting arm 70.

Having thus described my invention, what I claim and desire to secure by Letters Patent is—

1. The combination of an endless carrier having upper and lower flights and comprising moulds and transverse hinge rods connecting the moulds and having extended terminal portions projecting laterally beyond the same, guiding means located at opposite sides of the conveyor and receiving the ends of the said rods, a container for the reception of dough disposed above the endless carrier and having a valve, valve operating means projecting into the path of the extended terminal portions of the transverse hinge rods and actuated by the same for operating the valves, and means also engaging the extended terminal portions of the rods for actuating the endless carrier.

2. The combination with an endless carrier of the character described and the moulds forming a part thereof and having transverse hinge rods, of a container for the reception of dough disposed above the same, a valve in the bottom of said container, a pivotally mounted lever mounted in the path of movement of the hinge rods of the moulds, said moulds adapted to impart an oscillating movement to the lever, and means for transmitting a vertical reciprocal movement from said lever to the valve.

3. In a machine of the character described the combination with an endless carrier, of rotating members disposed at each end thereof and supporting the same, an automatically adjustable bearing for one of said rotating members adapted to maintain a constant tension on the endless carrier, a cam member on one side of the endless carrier, moulds on the endless carrier, covers thereon, lugs on the cover engaging the cam member, and means permitting movement of the cam member in unison with the movable bearing.

4. In a machine of the character described a main frame, a shaft journalled in each end thereof, one of said shafts being mounted in sliding bearings and said bearings being constant pulled in one direction by spring action, sprockets on each shaft, an endless carrier supported by said sprockets, moulds on the endless carrier, hingedly secured covers on the moulds, a projecting lug on each cover, and a U-shaped cam member supported by the main frame and having a sliding movement therein, said cover lugs engaging the cam and a rigid arm connecting the cam with the slidable bearing to cause said bearing and cam to move in unison.

5. In a machine of the character described, an endless carrier comprising a plurality of interspaced moulds, lugs formed on each side of each mould, rods passing through said lugs and pivotally connecting the same, a pair of rollers for each rod, one disposed at each end thereof, a trackway for the reception of said rollers, means engageable with said rods for driving said carrier, a container for the reception of dough disposed above the carrier, a valve in the bottom of said container, and means associated with said valve and adapted to be actuated by engagement with the rods of the carrier to open and close said valve.

6. A machine of the character described comprising a main frame, a shaft journaled adjacent each end thereof, rotating members fixed on said shafts, an endless carrier supported and driven by said rotating members, said carrier comprising a plurality of interspaced moulds having lugs formed on each side thereof, a rod passing through said lugs pivotally connecting the moulds, a roller on each end of each rod, a trackway engaged by said rollers, a hinged cover for each mould, cam means adapted to open and close said covers, a batter container disposed above the carrier, a valve in the bottom of said container, and means associated with said valve and adapted to be engaged and actuated by the rods of said carrier to open and close said valve.

MANJI MATSUO.